United States Patent
Phallen et al.

[11] Patent Number: 5,996,650
[45] Date of Patent: Dec. 7, 1999

[54] NET MASS LIQUID FILLER

[75] Inventors: Iver J. Phallen, Youngstown; Richard J. Jezuit, Jr., Lancaster; Robert Comfort, Buffalo; Scott McIlhagga, Cheektowaga; David J. Noworyta, Hamburg; Peter B. Millett, Jr., Buffalo, all of N.Y.

[73] Assignee: Oden Corporation, Buffalo, N.Y.

[21] Appl. No.: 08/969,231

[22] Filed: Nov. 13, 1997

Related U.S. Application Data

[60] Provisional application No. 60/030,973, Nov. 15, 1996.

[51] Int. Cl.$^6$ ........................................................ B65B 1/04
[52] U.S. Cl. ............................................. 141/83; 141/192
[58] Field of Search ...................... 141/2, 18, 83, 141/94, 192; 73/861.354, 861.355, 861.356, 861.357

[56] References Cited

U.S. PATENT DOCUMENTS

| | | |
|---|---|---|
| 4,401,141 | 8/1983 | Rosen et al. .............................. 141/192 |
| 5,029,482 | 7/1991 | Liu et al. . |
| 5,143,257 | 9/1992 | Austin et al. . |
| 5,228,485 | 7/1993 | Lewis et al. .............................. 141/83 |
| 5,515,888 | 5/1996 | Graffin ...................................... 141/192 |
| 5,570,729 | 11/1996 | Mutter . |

FOREIGN PATENT DOCUMENTS 4-18207  1/1992  Japan .

*Primary Examiner*—Steven O. Douglas
*Attorney, Agent, or Firm*—John C. Thompson

[57] ABSTRACT

Liquid filling apparatus and method of producing a fill or dose of a defined quantity of liquid based upon the mass of the liquid. In one embodiment, a servo motor driven rotary positive displacement pump is used to produce flow through a Coriolis mass flow meter to feed a positive shut-off filling nozzle, wherein mass flow data from the meter is used to control the servo motor-pump-nozzle to produce a precise fill dose of liquid based upon its mass.

29 Claims, 8 Drawing Sheets

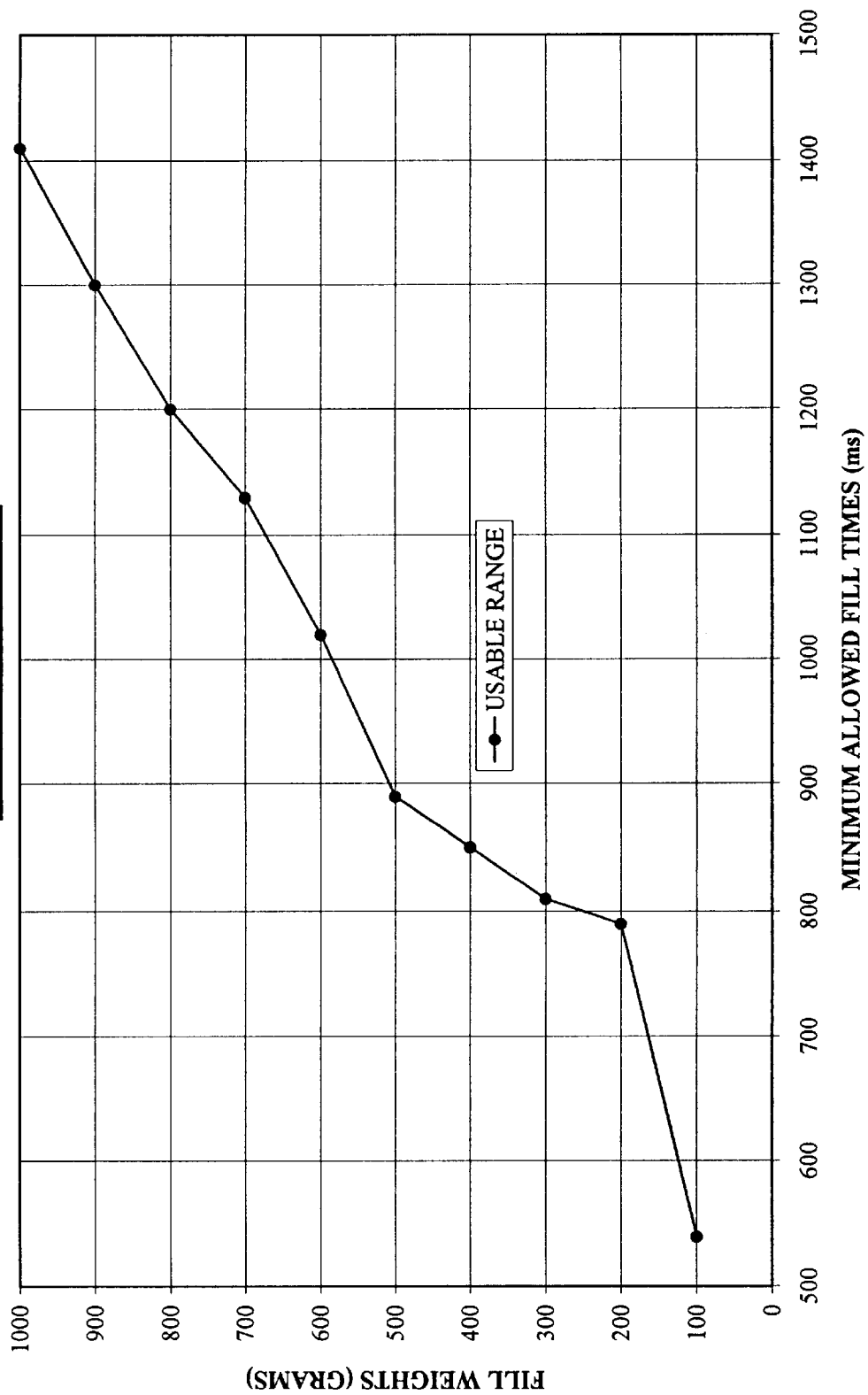

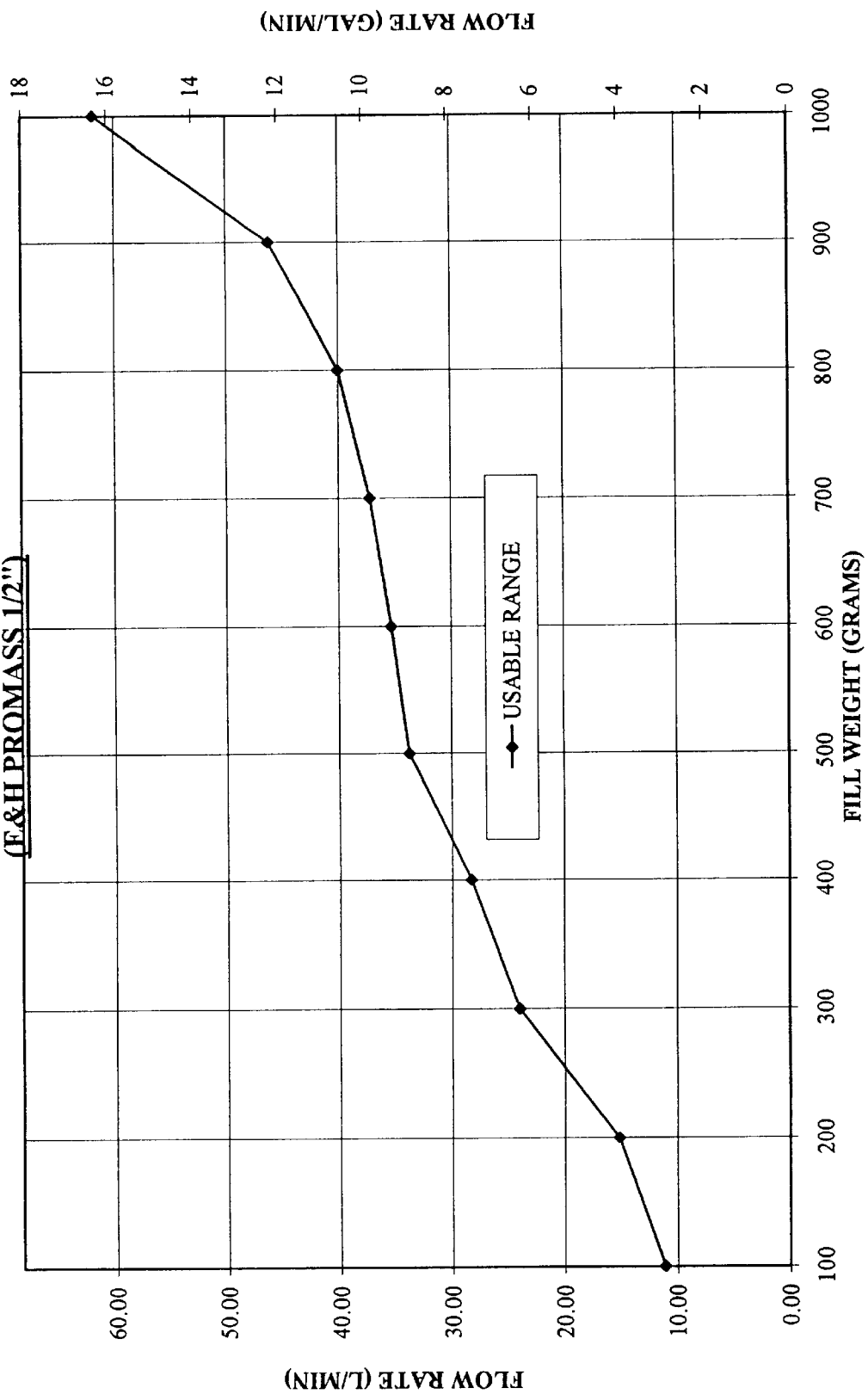

NET MASS LIQUID FILLER

This application claims benefit of provisional application Ser. No. 60/030973 filed Nov. 15, 1996.

TECHNICAL FIELD

The present invention relates generally to a liquid filling apparatus and method of producing a fill or dose of a defined quantity of liquid based upon the mass of the liquid. More particularly, the invention relates to the use of a servo motor driven rotary positive displacement pump to produce flow through a Coriolis mass flow meter to feed a positive shut-off filling nozzle, wherein mass flow data from the meter is used to control the servo motor-pump-nozzle to produce a precise fill dose of liquid based upon its mass.

BACKGROUND OF THE INVENTION

Many methods are known and used in liquid filling machines for the purpose of placing a liquid into a container, or package. These include volumetric filling methods which define a liquid dose using a positive displacement pump such as a piston pump or using a rotary pump, or a timed flow of liquid at a defined flow rate.

It is well known that many packaged liquid products vary in density from batch to batch and also over time within a batch. Therefore, a fill dose which is volumetric will vary in its weight as the density of the liquid changes, even when the volumetric quantity of liquid produced by the filling machine does not change. In most liquid filling manufacturing operations, it is necessary to maintain the quantity of product being placed into the package within certain required limits. The quantity of product being placed into the package is almost always measured and monitored by weight, using a scale device. When a volumetric filler is used to fill a liquid which does not change in density, periodically measuring the net weight of the fill dose is a means of tracking the stability and reproducibility of the volumetric fill produced by the filling machine and adjusting it as necessary. When a volumetric filler is used to fill liquid products which change in density, it is necessary to adjust the fill volume to follow the changing fill weights. In either case, if the filler used weight to determine the dose, the problems of tracking and adjustment of liquid fill dose would be solved.

Various means to fill liquids by weight are known. However, each has disadvantages and shortcomings. In one method, a volumetric fill is produced which is separately checked by weight using an electronic scale. The net weight obtained by checking is then used as a feedback signal to the filler to automatically adjust the volumetric dose to maintain a uniform liquid fill weight with varying machine or product conditions. The primary problem with this method is that in order to obtain a liquid weight on a scale with sufficient accuracy to be useful to adjust a filler, generally to better than one half of one percent of the nominal fill weight, requires a period of time that is too long to allow rapid production of filled containers. This is particularly the case because liquids tend to remain in motion within a vessel for a prolonged period, thus perturbing the scale readings. In addition, to determine the net weight of liquid being weighed on the scale, the weight of the container into which it has been filled must be know. This requires a pre-weighing or tare of each container before filling, using the same or a separate scale. This requirement further complicates and slows the process. In addition, in an automated system, two scales are required, one to tare the empty container and one to weigh the filled container, and this leads to very high expense which is rarely justified by the slow output speed of filled containers possible from such an arrangement. It is possible to disregard the container weight. However, it is well known that most containers vary significantly in weight one from the next and many vary to such a great degree as to not allow repeatable liquid filling within the required degree of accuracy.

In another method, liquid filling is done in such a way that the container is placed upon a scale and liquid is dispensed into the container until the desired net weight is reached. This is referred to as filling by weight or net weight filling. The problem with this method is twofold. First, the turbulence and relative motion of the liquid makes getting a precise weight difficult as a function of filling speed (flow rate). Second, electronic scales are limited in the rate at which they can track a dynamically changing weight. This limits the rate at which liquid can flow into containers. Further, before filling can begin, the container must be tared to eliminate its weight. This requires significant time as well.

In some designs, the liquid is introduced at a comparatively high flow rate until nearly all of the fill weight has entered the container, and then the flow rate is reduced to a very low flow rate to approach the desired weight with more precision. This is known as the "bulk and dribble" technique and it has the effect of slowing down the filling process as well.

In automated systems, either method is typically confined to expensive pharmaceutical fillers operating with a dedicated or narrow range of liquid products and fill weights at relatively low speeds, or to expensive rotary net weight fillers which operate at high speeds by virtue of having many scale filling positions, and which typically fill a narrow range of container sizes and weights. Another problem with scale based net weight filling is that scales cannot, in commercially practical terms, provide the dynamic range of weighing capability needed to allow their use in automated filling machines where a very large range of fill sizes must be filled on the same liquid filling machine. For example, a rotary pump volumetric filler could fill 100 mL containers with ±0.5% repeatability on the one hand, and then could fill 10,000 mL containers at ±0.5% repeatability on the other, without any change in the fitments or features or apparatus of the machine. This range of capability cannot be achieved with a scale based net weight filling machine without the need for substantial changes to the machine. Finally, scales impose very severe restrictions upon the means of construction of the machine itself, particularly where such a machine is to be constructed as an in-line (as opposed to rotary) intermittent motion automatic liquid filler. For example, because each container to be filled must be isolated from any other container, the containers must be properly spaced and separated upon the machine, a task which is completely unnecessary in volumetric machines. Furthermore, each scale must be mechanically isolated from the machine to prevent vibrations from affecting its operation and accuracy. In addition, it is impractical to add scale filling positions to scale based in-line machines as a means of increasing machine capacity.

OBJECTS AND SUMMARY OF THE INVENTION

It is a primary object of the present invention to overcome the numerous disadvantages, as set forth above, of net weight liquid filling methods which utilize scales to establish the weight of a fill or dose. More particularly, primary objects of the present invention are:

1. To disclose a unique and novel means of devising a net weight liquid filler capable of producing liquid fills based upon weight, with a demonstrable repeatability of at least ±0.5% of the mean weight of at least 25 sample fills, across the specified useful fill dose range of the machine.
2. To disclose a unique and novel means of net weight filling with a demonstrable ability to span a useful range of fill weights over a range of at least 1 to 100, without the necessity to change, replace, or alter any of the major elements of the machine, all fill weights being within the repeatability range as stated above.
3. To disclose a novel net weight filling apparatus which does not require a scale to produce fills based upon weight and is therefore free of any requirement to tare a container before filling.
4. To disclose a unique net weight filling apparatus which, in practical and comparative terms, does not restrict the flow rate at which a liquid can be placed into a container or package, particularly when compared to known positive displacement pump volumetric fillers, and to scale based weigh fillers.
5. To disclose a novel net weight filling apparatus which does not, in a significant manner, change, alter, or restrict the means, methods, nature, or capability of construction of an automatic in-line liquid filling machine when compared to such means, methods, nature, and capabilities of volumetric in-line liquid filling machines of know type. For example, the volumetric filling devices fitted to a multiple filling station GEN3 PRO/FILL 3000 in-line automatic filling machine as manufactured by Oden Corporation of Buffalo, N.Y. could be removed and replaced by a like number of the net weight fillers of the type of the present invention without the requirement to alter or change the nature of the remainder of the machine.
6. To disclose a unique net weight filling apparatus which does not, when fitted to an automatic filling machine of any architecture, comparatively limit the range of fill sizes and container sizes and shapes which can be handled by the machine, thus overcoming such limitations as established and imposed by net weight fillers based upon scales.
7. To disclose a novel net weight filling apparatus which is not, in practical terms, subject to disruption of function or reduction in accuracy as a function of vibration originating from the filling machine of which it may be a part.
8. To disclose a unique net weight filling machine which can be freely added to an existing automatic filler, so equipped, in a modular manner, in order to expand the speed capability of the machine.

The present invention relates to a novel and unique apparatus for producing a net weight liquid fill. The machine consists, in its major elements, of a pump which is driven by a servo motor which is fitted with an incremental encoder, a Coriolis liquid mass flow meter, a positive shut-off liquid filling nozzle, and an electronic controller assembly to integrate and control the other elements.

These and other objects and advantages of this invention will be apparent to one having ordinary skill in the art after a consideration of the following detailed description taken in conjunction with the accompanying drawings.

BRIEF DESCRIPTION OF THE DRAWINGS

FIGS. 7 and 8 are graphs illustrating the minimum fill times at various fill rates, and the maximum allowable volumetric flow rate at various fill rates, respectively.

DETAILED DESCRIPTION

Figure 1:
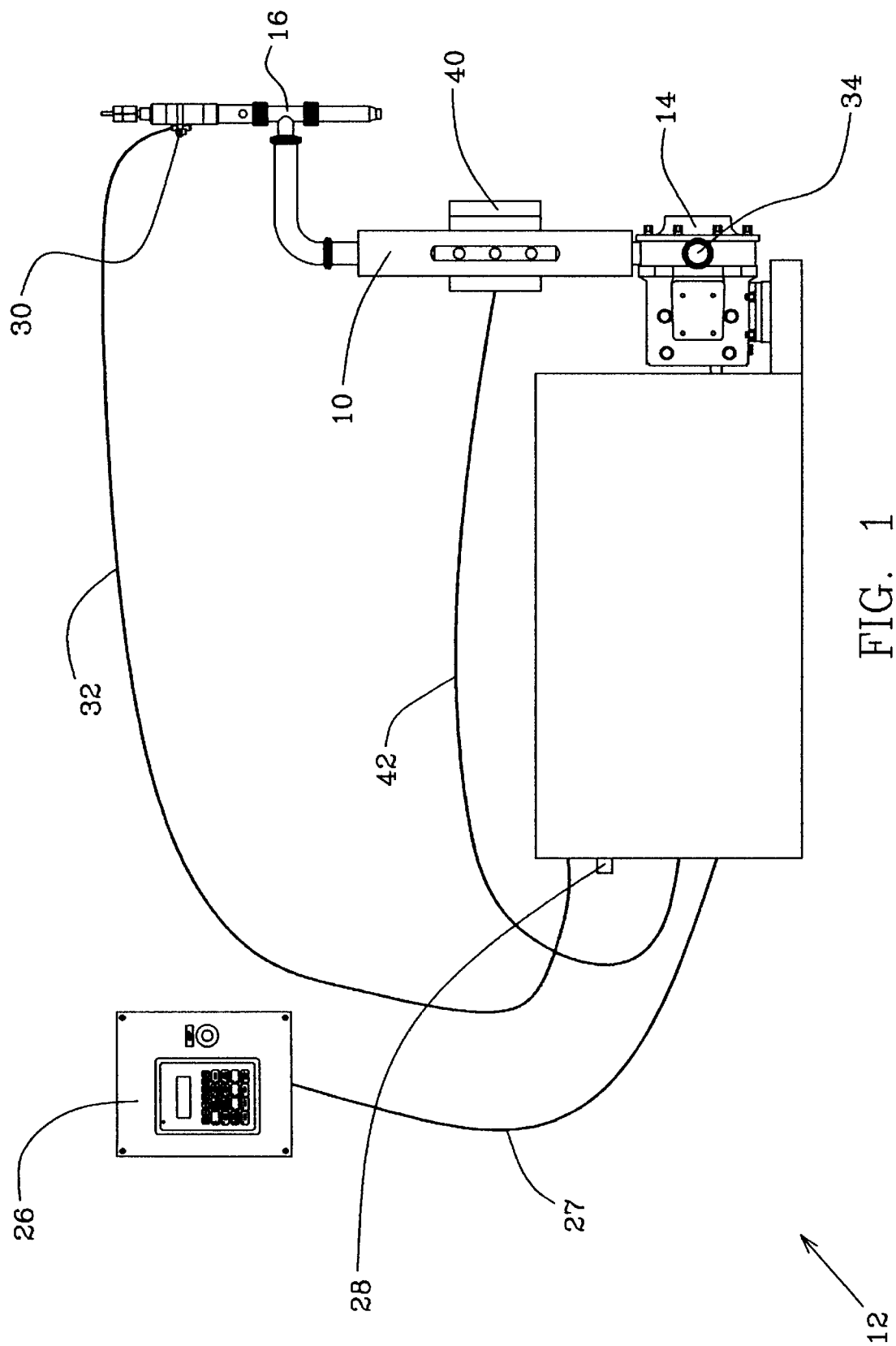
FIGS. 1 to 4 illustrate a first embodiment of this invention, FIG. 1 being a side view, FIG. 2 being a cut-away side view, FIG. 3 being a top view, and FIG. 4 being a front view.

Coriolis mass flow meters, indicated generally at 10 in FIGS. 1–6, are electromechanical devices capable of directly measuring the mass flow rate of a liquid by measuring the amplitude of a Coriolis force which is created within the meter as liquid flows through it. Such meters are, by way of example, manufactured by Micro Motion of Boulder, Colo., and Endress+Hauser of Greenwood, Ind.

It is to be understood that Coriolis mass flow meters measure mass, not weight. The distinction is one of Newtonian physics wherein matter has mass regardless of the presence or absence of a gravity field. Scales measure weight and therefore require a gravity field to function. When a Coriolis liquid mass flow meter is used in a gravity field, as is the primary intention herein, the distinction between weight and gravity is unimportant and, thus, the two terms will be used interchangeably throughout this application.

In the embodiments of FIGS. 1–5, the apparatus for filling containers, which is indicated generally at 12, uses a rotary pump 14 to move liquid through the mass meter 10. In the first embodiment, when no filling is occurring, the pump is motionless and no liquid flow is occurring. When a fill is occurring, the flow of liquid through the mass meter and the positive shut-off nozzle 16 is caused by the rotation of the pump. For purposes of this invention, the pump can be of many different types including, but not limited to, gear types, vane types, lobe types, circumferential piston types, centrifugal types, piston types, or progressing cavity types. The positive shut-off liquid filling nozzle 16 shown in FIGS. 1–5 integrates a filling nozzle and a positive shut-off valve into a single unit, the valve being associated with the nozzle in such a manner that when open flow is permitted through the nozzle, and when closed there is no flow through the nozzle The drive train connecting to the pump in the present invention is a motor 18, preferably a DC type permanent magnet motor, directly coupled to a gear box 20, preferably having an in-line helical gear reducer, which is, in turn, directly coupled to the pump. With this arrangement, all motion of the pump is directly controlled by the motor, free of any other mechanical engagement or disengagement or mechanical brake device. The motor can also be of the brush or brushless type, or can be an AC type under suitable variable speed control, as for example using an electronic variable frequency AC drive.

The Coriolis meter is chosen to be of the correct size, among a range of sizes, in order to provide the range of filling weights desired, and as correlated to the range of flow rates which can be provided by the pump with which it is associated. The Coriolis meter is characterized by a minimum mass flow rate it can monitor at a specified accuracy, as well as a maximum flow rate it can monitor at a like accuracy. By way of example, a Coriolis mass meter manufactured by Endress+Hauser of Greenwood, Ind., under the trade name PROMASS M, in a size known as "½ inch" can measure 12 to 238 pounds per minute of liquid flow rate, at an accuracy of +0.25% of rate, full scale. The capabilities of this mass meter, when used as part of the filling machine of the present invention, arrived at experimentally, are included herein in the following table and in graphic fashion (FIGS. 7–8) for fill dose weights from 100 grams to 1000 grams.

TABLE I

A NET/MASS Liquid Filler
CHARACTERIZATION OF MASS METER DOSE
DURATION REQUIREMENTS
ENDRESS + HAUSER
½ INCH PROMASS

| Tested Mass Dose | Minimum Allowable Absolute | Maximum Allowable Volumetric Flow Rate | |
|---|---|---|---|
| (Grams) | Fill Time (AFT) | LPM | GPM |
| 100 Grams (Min.) | 540 mS | 11.11 | 2.93 |
| 200 Grams | 790 mS | 15.19 | 4.00 |
| 300 Grams | 810 mS | 22.22 | 5.86 |
| 400 Grams | 850 mS | 28.24 | 7.46 |
| 500 Grams | 890 mS | 33.71 | 8.91 |
| 600 Grams | 1020 mS | 35.29 | 9.32 |
| 700 Grams | 1130 mS | 37.17 | 9.82 |
| 800 Grams | 1200 mS | 40.00 | 10.56 |
| 900 Grams | 1300 mS | 46.15 | 12.19 |
| 1000 Grams | 1400 mS | 61.77 | 16.32 |

Note: The minimum fill times and, consequently, the maximum flow rates, for each fill are those which assure a dose repeatability of ± 0.5 percent or better.

It is important to understand that the nature and capabilities of the Coriolis mass meter as it relates to the purpose to which it is applied in the present invention, and the characterization of the allowable limits of its use within the apparatus of this invention, constitutes a unique and novel aspect of the present invention.

Figure 2:
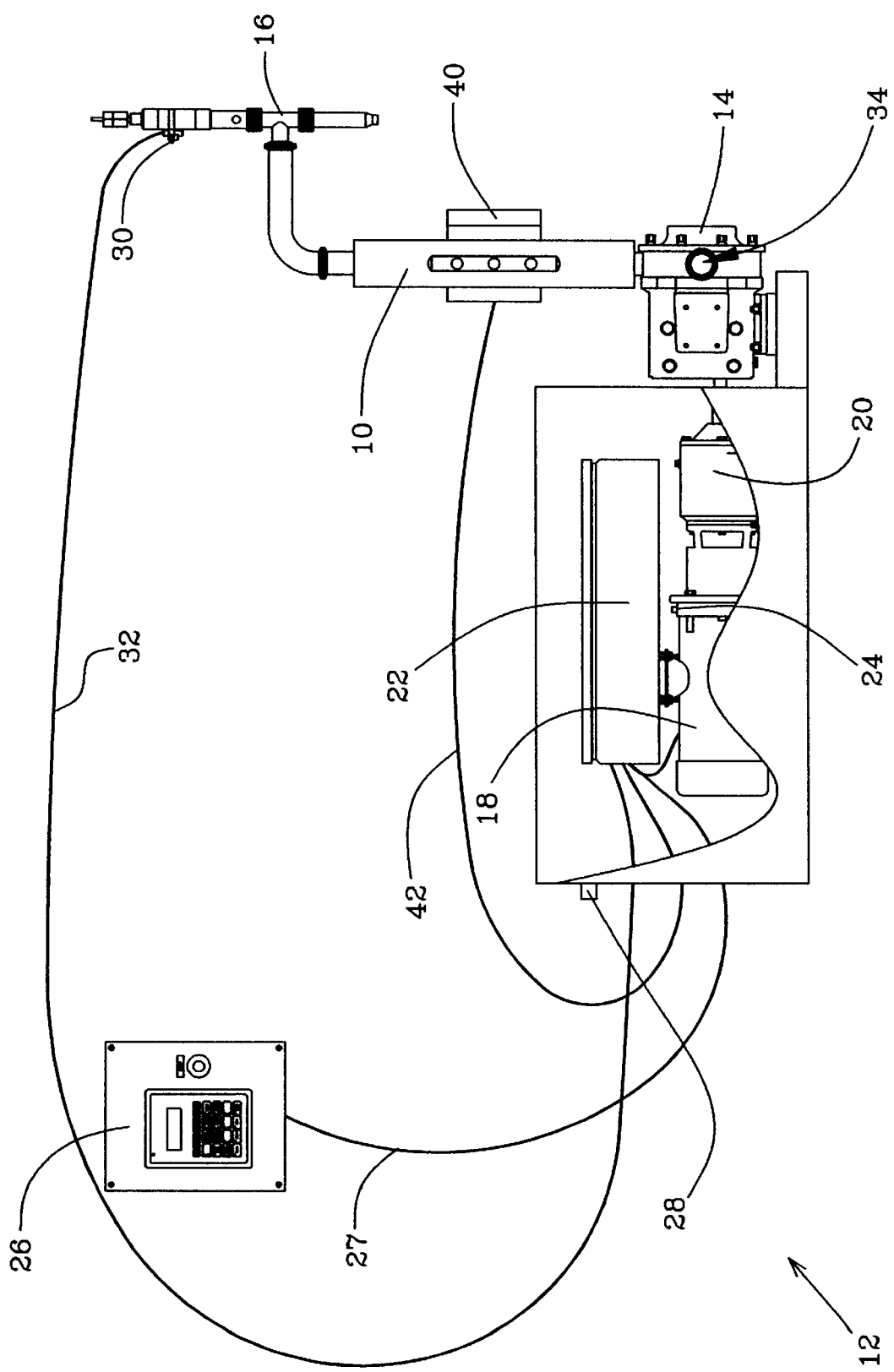
Figure 3:
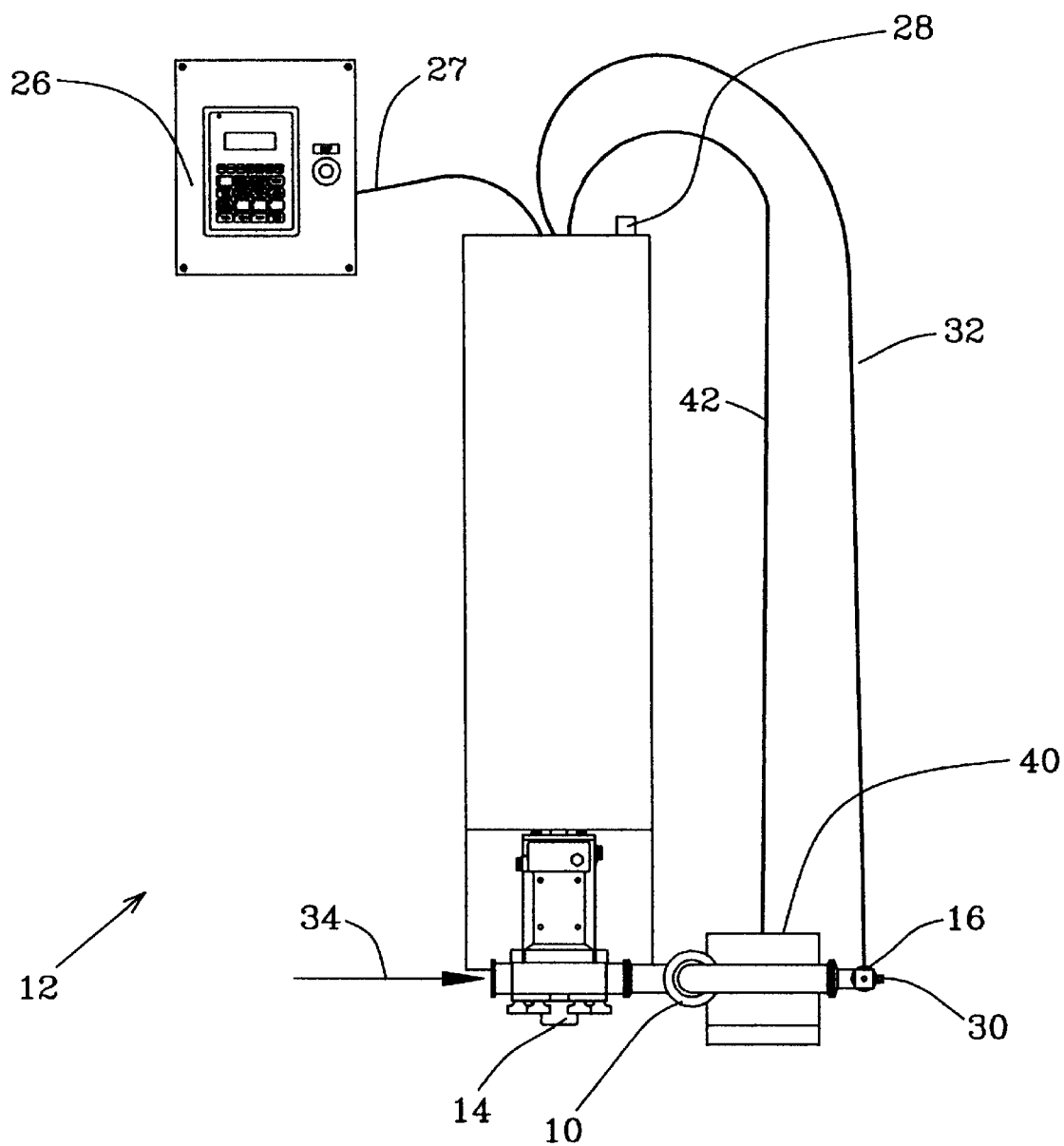
Figure 4:
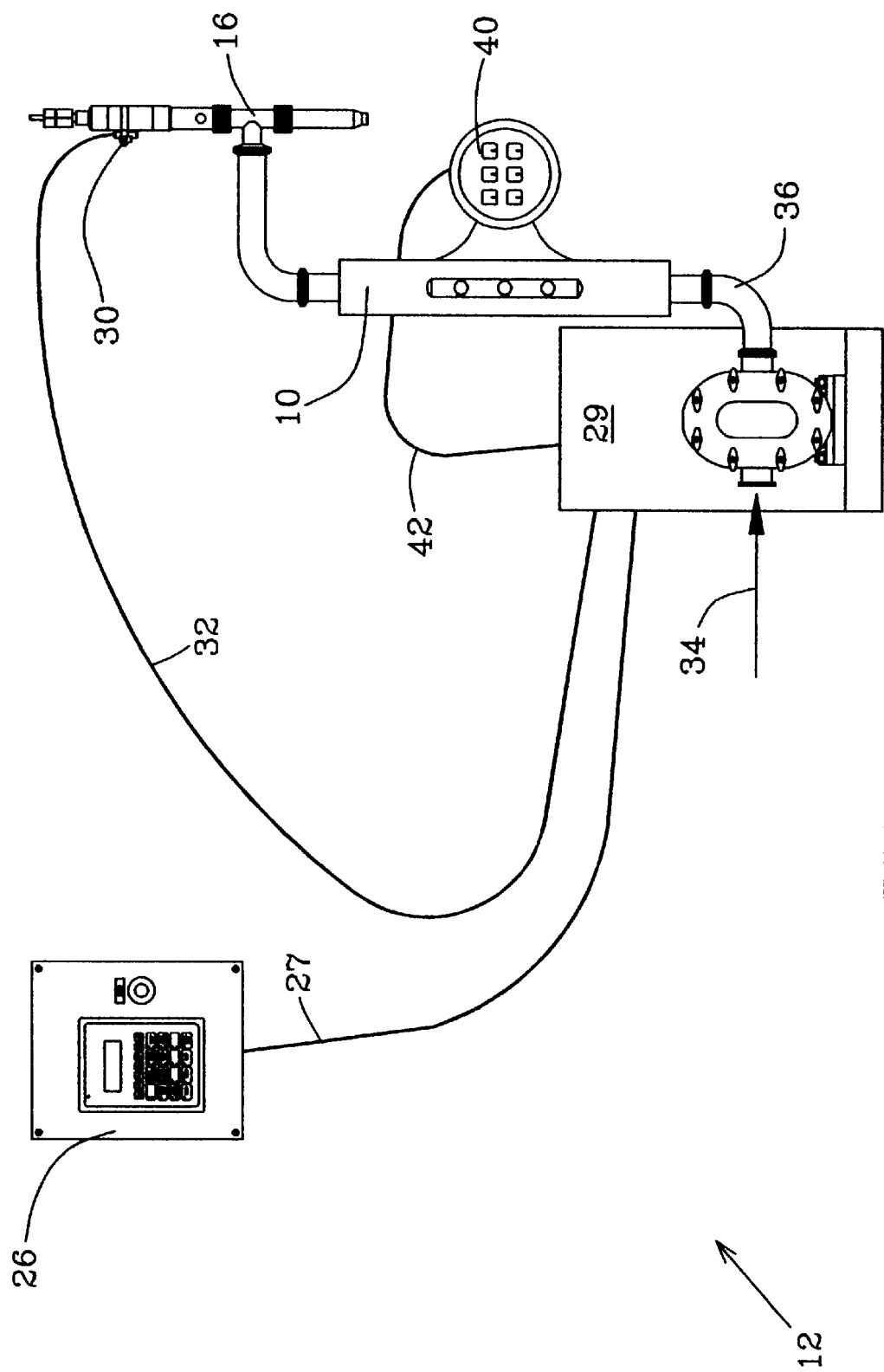

Any Coriolis mass flow meter can be shown experimentally to lose accuracy, as a percent of rate of flow, at the low end of its flow range. Therefore, in the context of the net weight filling machine of the present invention, there can be said to be a minimum flow rate of liquid through the meter and into the container below which accuracy of net mass dose cannot be maintained. Accordingly, it is a unique and novel feature of this invention that the electronic controller assembly 22 (which constitutes a necessary and major element to this invention) is provided with means to determine if the selected volumetric flow rate is above the necessary minimum mass flow rate. In the first and second embodiments of this invention, this is accomplished by providing the drive train, preferably the motor shaft, with a suitable digital incremental encoder 24 as shown in FIG. 2. The frequency of the encoder will vary from zero when the motor is at rest to some known maximum when the motor is allowed to rotate at its maximum allowed rotations per minute. Thus, a certain frequency can define a certain motor speed and thus pump speed and thus nominal volumetric flow rate. The frequency may be utilized in a directly digital manner whereby it is measured by the controller assembly 22, and the motor drive electronics adjusted to force or assure a minimum volumetric flow rate. Alternatively, the frequency may constitute the velocity feedback signal directly to the motor drive electronics, with the drive being calibrated to assure that a minimum motor velocity requirement cannot be violated. Both methods are effective and are preferred. It will also be understood that the output of an AC or DC tachometer or other feedback device could be used for this purpose. In addition, because of the critical nature of this parameter to correct functioning of the net mass liquid filler of the present invention, an electronic alarm function can be preferably provided with the design in order to warn of any malfunction in the minimum volumetric flow rate detection method.

Another critical aspect to the operation and capabilities of the Coriolis mass meter as it relates to the purpose to which it is applied in the present invention concerns the delay in obtaining mass flow data from the meter, from the inception of flow through the meter. This delay is due, in part, to the measuring frequency or interval associated with the sensor mechanism of the meter, and, in part, to the electronic processing time required to amplify, filter, convert and format the electronic signal from the sensor into usable form. This delay may be termed flow start-up latency.

Coriolis mass meter flow start-up latency forces the characterization of the allowable limits to meter use within the apparatus of this invention, and therefore the method, nature, and format of this characterization constitutes a unique and novel aspect of the present invention. Thus, it can be shown experimentally that for any given mass dose within the usable range of the filling machine as a whole, and the specific size mass meter in particular, there exists a minimum fill time below which a particular standard of repeatability cannot be maintained. Stated differently, it can be shown empirically that there is a maximum flow rate which can be allowed for any particular dose size, above which dose accuracy rapidly deteriorates. This phenomenon is primarily due to the flow start-up latency phenomenon in that a minimum finite amount of time must be allowed, in any given fill or dose event, to obtain sufficient mass flow rate data from the meter to constitute an accurate data sample, within the established standards of repeatability. Thus, for example, the PROMASS M meter previously mentioned exhibits a minimum required flow time for any given dose (or maximum flow rate) to assure a repeatability of ±0.5% or better. These data are included herein in the above table and in FIGS. 7–8 as a means of illustration of the phenomenon. Note that the flow rates are expressed volumetrically but could be expressed as mass flow as well.

Because of this minimum mass meter on time requirement as it relates to mass dose size, it is a unique and novel feature of this invention that the electronic controller assembly, (which constitutes a necessary and major element to this invention), is provided with means to determine if the operator selected volumetric flow rate at which the pump system will operate to cause mass flow of liquid through the mass meter is at or below the allowable maximum for a given selected mass fill size. This is preferably accomplished using the incremental digital shaft encoder previously described. The frequency of the encoder varies directly with motor speed which directly defines volumetric flow rate. Using a precision frequency clock, the electronic controller assembly, typically a micro controller or programmable logic controller (PLC), can measure the encoder pulses in unit time and thus define a frequency. This frequency can be compared to an allowable maximum value for a given mass dose as entered into the controller, for example through an operator interface 26, using a data table or other digital data manipulation means. The interface 26 is coupled to the controller via a cable 27. If the flow rate is found to be too high, it can be incrementally reduced until it is found to be within the safe operating area, or an inhibit function can be triggered and an annunciation or display of the disallowed condition can be made. In addition, because of the critical nature of this maximum permissible flow rate at a given mass dose size to the correct functioning of the net mass liquid filler of the present invention, an electronic alarm function can be preferably provided for continuous monitoring of the volumetric flow rate in order to warn of any malfunction in the maximum flow rate control method.

Because of the minimum mass meter flow rate characteristic previously described, in combination with the mass meter flow start-up latency previously described, it is a unique and novel feature of the first preferred embodiment of this invention that, regardless of the liquid flow rate selected to be pumped through the mass meter and into the container, within the allowable minimum and maximum rates as previously explained, the flow rate is reached in less than 100 mS (0.10 seconds) from the start of motor rotation. This is done in the preferred embodiment by using a DC motor drive capable of such acceleration of the motor and pump without need for operator or manual set-up or intervention and without significant overshoot of the target velocity. By this method, it is assured that the minimum mass flow rate of the meter is established or exceeded on or before the end of the flow start-up latency period. This, in turn, enhances the useful low end dose capability of the system, as can be shown empirically.

As utilized in the present invention, the rate of liquid mass flow through the meter is available to the filler electronic controller assembly as a pulse train which varies directly in frequency as a function of the rate of mass flow, the frequency typically (but not necessarily) being zero at a no flow condition. This can be referred to as a frequency modulated signal. The pulse train from the meter is preferably optically coupled to the filler controller, where it is counted against a pre-set counter, the pre-set representing a mass dose. The mass dose pulse train can be scaled within the controller to allow selection of fill dose based upon engineering units, such as grams or pounds.

As will be appreciated by one skilled in the art, it is necessary to assure that the meter's mass flow output frequency is at zero or some specified frequency when there is no flow through the meter. This is readily achieved following procedures established by the particular mass meter manufacturer. As will also be clear to one skilled in the art, it is essential that the zero frequency or specified frequency at no flow be maintained without variation throughout the period that the net mass filler of the present invention is operating. A failure of this to be the case would cause incorrect fill weights to be produced.

Because the no flow mass flow frequency must be critically known and maintained, the present invention, in its embodiments, uniquely includes a means within the electronic controller assembly to monitor the mass flow frequency output and provide an inhibit and alarm function should the meter lose its no flow calibration as previously established. The means by which this is accomplished includes a sampling of the meter's mass flow frequency output when the filler is off and in a no flow condition. The sample period is for a precise period and can thus establish the frequency of the sampled pulse train. The frequency can typically be varied from zero to several thousand Hertz. In the instance where the selected zero flow frequency is not zero, the sampled frequency is compared to an upper allowed frequency and a lower allowed frequency which are typically only narrowly separated. An excursion of a sample or samples of the meter frequency above or below the allowed frequency band width results in the inhibiting of the filler from further operation and in alarm functions and, typically, an annunciation at the display of the controller noting that re-calibration of the mass flow meter is required. In the instance, as is more common, where the selected zero flow frequency is zero Hertz, any pulses from the meter's mass flow output are counted during the sample period. If these pulses exceed some desired threshold number of one or more, or if a specified number appear over some desired multiple of sample events, the consequences are as described above. In passing it should be noted that there is no danger of the pre-set counter being incremented by any pulse from the mass meter while the filler is in a no flow condition because the counter is enabled only during a filling condition.

In the preferred embodiments of the net mass filler of the present invention shown in FIGS. 1–5, an incremental encoder is utilized to provide a digital feedback loop to the electronic servo drive, allowing the establishment of an extremely precise and stable control of the speed of the motor, gear reducer, and pump. The pump utilized in the preferred embodiment is a precision rotary positive displacement unit. Taken together, these elements allow the volumetric liquid flow rate through the meter to be established with great precision. It is well understood to those skilled in the art that the more precise and stable and invariant the flow rate through a flow meter, the more accurate can be the flow rate sensed by the meter. In effect, the less change a meter must detect and transmit, the more accurate it becomes. This logic seems circuitous until it is considered that in the present invention it is a mass flow and not volumetric flow that is of concern. Thus, if variation in liquid density is of prime concern, as is the case with the present invention, the meter's ability to sense and transmit a change in mass flow due to a change in liquid density is greatly enhanced if the volumetric flow of the liquid through the meter remains constant. In effect, the meter is more accurate when tracking a mass flow rate change as a result of only one variable rather than more than one.

Accordingly, the present invention is unique and novel in its configuration of an encoded motor-servo motor drive-gear reducer-pump combination that assures accurate and stable control of volumetric flow rate through the Coriolis mass meter. The net mass filler of the present invention is unique in being able to establish and demonstrate a volumetric dose repeatability which is as accurate as the mass dose repeatability when both are tested on a density stable liquid such as water. Because the filler is provided with a switching means 28 which allows the pulse train from the incremental digital encoder to be counted by the pre-set dose counter in the filler controller, in lieu of the pulse train from the mass meter, the present invention is particularly and uniquely provided with the means to establish and validate a volumetric dosing capability rather than a mass or weight based dose capability. Thus, it can be shown experimentally that a filler of the present invention, when operated as a volumetric dosing device, with the mass meter in place in the fluid flow pathway of the machine but not providing a mass based flow signal to the controller, is capable of stable volumetric dosing to a repeatability of ±0.5% or better of the mean dose of a dose group, across the same dose size range as obtainable from the mass meter fitted to the machine. It can also be shown experimentally that the filler of the present invention, when operating on a mass flow basis, suffers a reduction in the accuracy or repeatability of mass dose when the volumetric flow rate through the meter is deliberately perturbed during the time of the mass flow constituting the dose. The motor 18, gear box 20, electronic controller assembly 22, and encoder 24 are all mounted within an enclosure 29, which also supports the switch 28.

Accordingly, the net mass filler of the present invention is unique and novel in its embodiments of FIGS. 1–5 as such preferred embodiments particularly allow the establishment and maintenance of a precise volumetric flow rate through the Coriolis mass meter, the precision of volumetric flow particularly enhancing the degree of mass based dose repeatability. The present invention is further novel in providing a method, through switching means, to change the dose basis from mass to volume and hence to provide an empirical means to test and assure correct and proper operation of the volumetric liquid flow components of the filler of the present invention, and conversely, the accuracy and correct operation of the mass meter.

The filler of the present invention is also novel in providing the ability to operate on a volumetric basis as a back-up dosing method in the event of a fault in the mass meter.

The first preferred embodiment of the present invention as shown in FIGS. 1–4, in which the pump is turned on and off, is operable with a source of AC electric power. After being powered, it is necessary for an operator to select a mass fill dose and flow rate, within the constraints previously described. This is typically done using the operator interface 26 consisting of an LCD display and membrane key pad.

When triggered to produce a fill, the positive shut-off liquid filling nozzle 16 is opened, typically using a pneumatic actuator precisely controlled by a DC operated solenoid valve. The positive shut-off nozzle is encoded such that its fully opened position can be sensed by a nozzle position sensor 30, which sends a signal to the filler's electronic controller assembly via a cable 32. After the nozzle has been confirmed as open, the DC drive motor 18 is provided with a source of DC current and voltage in such a manner as to precisely and rapidly accelerate it to the programmed RPM. The unique and critical nature of the speed of acceleration of the motor has already been described. As the motor is directly coupled to a precision in-line helical gear reducer 20, which is, in turn, directly coupled to the precision rotary positive displacement pump 14 which receives fill liquid from a source of liquid represented by arrow 34, the pump being located in a first fluid flow conduit 36 which extends from the source 34 to the meter 10. (A second fluid flow conduit 38 extends from the pump 14 to the nozzle 16). Full operation of the pump causes a precise volumetric flow rate through the mass meter 10. The mass meter provides a mass flow rate pulse train to the filler's high speed counter in the electronic filler controller 22 through a mass meter transmitter 40 and cable 42, which counter is incremented by the pulses until they equal a pre-set value representing a net mass dose. When the pre-set is reached, the motor 18 is no longer powered and a solid state dynamic brake is electronically switched into the motor armature to effect a rapid and precise deceleration of the drive motor. As the motor slows down under dynamic braking, the frequency of the incremental encoder 24 decreases. When that frequency decays to some defined value near to but greater than zero, a frequency detector circuit in the controller causes the positive shut-off filling nozzle to close. This method assures a high degree of repeatability to the end of the fill event, and the method assures that the nozzle closes against a low flow velocity and pressure.

Figure 5:
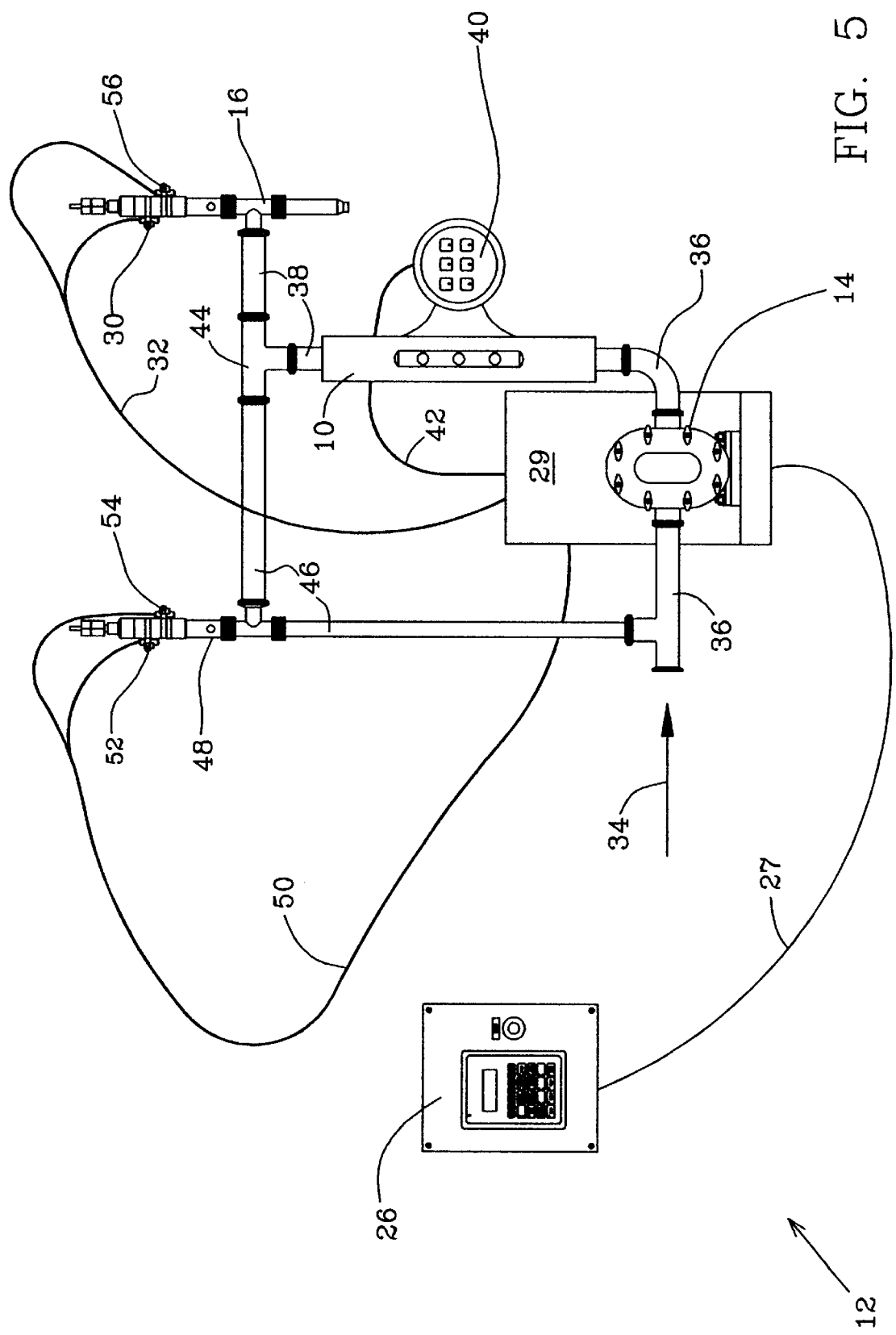
FIG. 5 is a front view of a second embodiment of this invention.

In some instances, it is necessary or desirable to maintain a liquid in a continuous state of flow as it is being filled into containers. This would be the case, for example, when a suspension is being filled and the solids suspended in the liquid quickly fall out of homogeneous suspension. To solve this and other filling problems and allow the use of the net mass liquid filler of the present invention, a second preferred embodiment which is illustrated in FIG. 5 is required.

This second embodiment includes all of the elements of the first embodiment previously described. However, instead of an intermittent flow in the fluid flow pathway, the filler is arranged to allow liquid to move continuously through the fluid flow pathway. This embodiment differs from the first embodiment in that it is provided with a three-way pipe joint (or tee) 44 in the second fluid flow conduit 38. A first branch exits from the tee to the nozzle 16, this first branch being an extension of the second fluid flow conduit 38. The second branch 46 extends back to and joins the first fluid flow conduit upstream of the pump. In this embodiment, liquid enters the pump, which is rotated continuously at some defined volumetric flow rate. The liquid is displaced out of the pump, through the Coriolis mass flow meter, through a portion of the second fluid flow conduit 38, tee 44, and second branch 46 which is provided with a fast acting positive shut-off valve 48. Continuous flow through the meter places the meter in a state of continuous mass flow output, removing any flow start-up latency in this embodiment. When the filler is not filling, the flow exits the flow meter and is returned to the infeed of the pump (or alternatively back to the source of fluid supplying the pump). Thus, under these conditions, the liquid is recirculating through the described flow loop in continuous motion. In the return leg of the recirculation loop the fast acting positive shut-off valve 48 may be of the same construction as the positive shut-off filling nozzle 16. This is termed the recirculation valve.

When a net mass fill is to occur, the positive shut-off filling nozzle 16 is opened. Its open condition is directly sensed by sensor 30 which sends a signal to the filler controller 22. After the controller has detected the open condition of the filling nozzle 16, the recirculation valve 48 is rapidly closed, its open or closed status also being sensed by valve open and valve closed sensors 52, 54, respectively, which sensors transmit signals to the controller through cables 50. This causes the flow through the mass meter to be quickly and precisely diverted without perturbation or alteration in the volumetric flow rate, through the mass meter. The flow is diverted to the filling nozzle and the mass flow rate pulse train is counted in the same manner as previously described, pulses being counted from the instant when the filling nozzle is detected as being in an open condition. The filling nozzle remains open until the pre-set counter has been fully incremented to equal its pre-set. When this occurs, the recirculation valve 48 is rapidly and precisely opened and confirmed by its sensor to be opened. The positive shut-off filling nozzle 16 is then rapidly closed (the closed position being sensed by sensor 56), bringing the net mass filling sequence to an end, and re-establishing the recirculation loop. Note that the valve sequence at the beginning and end of the net mass fill is mediated and controlled by the position sensors for open and closed status of each valve. Also note that the sequence of operation assures that the flow discharge of the pump is never blocked, even momentarily, and thus there are no significant changes in volumetric flow rate or any pressure spikes or excursions associated with the flow diversion.

It will be appreciated that this second embodiment of the present invention satisfies and retains all of the advantages and capabilities of the first embodiment. Further, this second embodiment also provides the means to utilize the mass meter to best results and within the same scope of requirements as brought forth in regard to the first embodiment. Furthermore, the mass dose range and accuracy and repeatability can be shown to be essentially equivalent to the results derived from the first embodiment.

Figure 6:
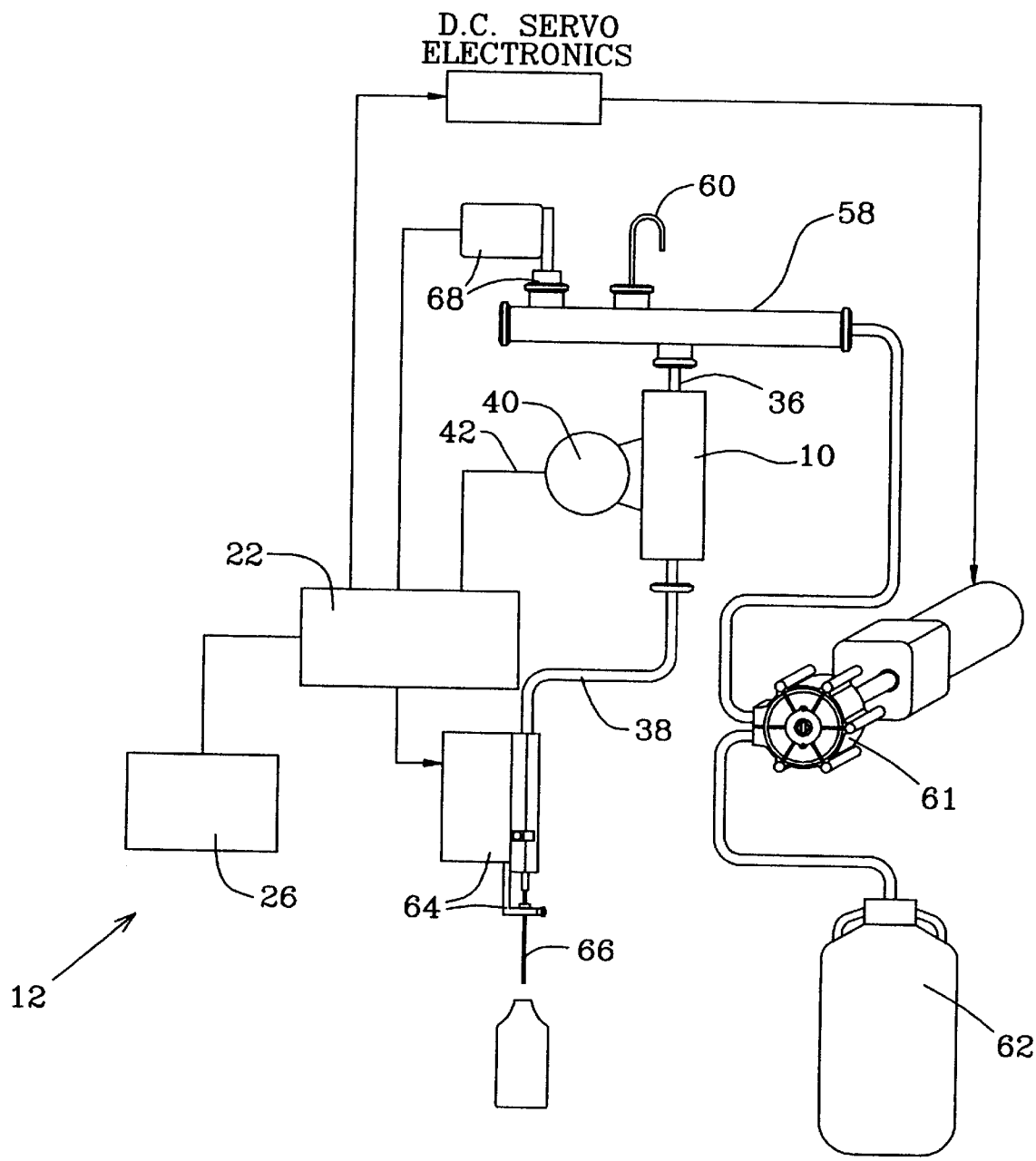
FIG. 6 is a front view of a third embodiment of this invention.

The third embodiment, shown in FIG. 6, differs from the first and second embodiments in that a pump is not used to establish flow through the Coriolis mass meter, flow being established by gravity.

Thus, the liquid to be filled is maintained in a reservoir 58 provided with a vent 60 to atmosphere, the reservoir being positioned above the mass meter 10 and the positive shut-off nozzle 16. The reservoir is the source of the liquid for the dose, but the reservoir can be supplied with liquid in many ways, including a valved gravity feed from another source (not shown), or from a pump 61 connected to a bulk supply 62 as illustrated in FIG. 6. In any case, the reservoir 58 is directly connected to the infeed of the mass meter with a suitable first fluid flow conduit 36. The outfeed of the mass meter is then directly coupled to an on/off flow control valve 64 using a suitable second fluid flow conduit 38.

The flow control valve 64 in this embodiment can be a positive shut-off filling nozzle as previously discussed, or a diaphragm valve, or as illustrated, a pinch valve 64 designed to constrict flexible tubing (no number) to prevent flow to nozzle 66 and to allow the flexible tubing to open to permit flow. A solenoid or air operated popette valve can also be suitable, as can any liquid valve species which is fast acting and offers a high degree of repeatability.

To establish and maintain a precise rate of volumetric flow through the mass meter 10, the level of the liquid in the reservoir is established and maintained at a constant and precise level. This can be done in a variety of ways including though the use of a point contact sensor 68 capable of detecting the liquid-gas interface in the reservoir. Alternatively, the level of the liquid in the reservoir may be established and maintained through the use of an ultrasonic non-contacting sensor, or by a float type sensor, among others. The importance of establishing a stable and repeatable volumetric flow through the mass sensor has been extensively discussed previously and is analogous in this embodiment. As the level within reservoir 58 starts to decrease, a signal will be sent by the sensor 68 via cable 70 to controller 22, which will in turn cause a DC servo motor 72 to be driven, the motor 72 being suitably coupled to pump 61 to cause it to be driven. In the illustrated embodiment, the pump is a peristaltic pump. The pump will be driven as needed to maintain the desired level in the reservoir. When the level sensor probe again detects the liquid level, the pump drive motor is turned off. Because the level of the liquid within the reservoir is essentially constant, there is a fixed pressure head established by gravity, and thus a constant volumetric flow is established for each liquid, as long as the differential height relationship between the reservoir 58 and filling nozzle 66 are fixed while flow occurs.

During set-up of this net mass filler embodiment, the differential height of the reservoir and filling valve may be varied to establish a volumetric flow rate through the mass meter to conform to the constraints previously described as well as to allow efficient filling of a particular dose into a particular container. The selection of the orifice through the filling valve 64 or filling nozzle 66 can also serve to modulate the volumetric flow rates to this purpose.

In conjunction with meeting the volumetric flow rate constraints of the Coriolis mass flow meter, it is a particular feature of this embodiment that volumetric flow can be measured using a highly precise and stable quartz crystal oscillator which comprises a part of controller 22. The oscillator provides a highly repeatable pulse train which, when counted by the high speed counter of the electronic controller 22, defines a volumetric dose from the apparatus of the third embodiment. Thus, by measuring the volumetric dose for a given quartz oscillator count at various differential height relationships between the reservoir and filling nozzle, the physical requirements needed to meet the volumetric flow requirements of the mass meter can be established. In this manner, a volumetric pulse train is derived which is analogous in use and function to the digital incremental encoder of the previously described embodiments.

In operation, a mass fill begins with the opening of the filling valve 64. This allows an essentially instantaneous volumetric flow to be established through the mass meter 10. The mass meter transmitter 40 provides a mass flow rate pulse train to the high speed counter in the controller 22 which is incremented by pulses until they equal a pre-set valve (established through the operator interface 26) representing a net mass dose of liquid. The filing valve 64 is then rapidly closed, ending flow through the system.

It is important to note that in this embodiment, as in the previous two, it is possible to switch the high speed counter input between the volumetric pulse train and the mass meter pulse train. This provides a means of checking the repeatability and proper functionality of the components and devices constituting this embodiment, thus assuring the best level of accuracy or dose from the mass meter, as previously discussed.

While a gravity mediated flow system is described above, wherein a precise pressure head is achieved by maintaining the fill liquid in the reservoir at an essentially constant level, it should be obvious that the reservoir may be pressurized in the system just described, provided that the pressure in the reservoir is maintained at some suitably constant value in order to achieve an essentially fixed pressure head.

It will be understood that the net mass liquid filler of the embodiments set forth above can be utilized alone as a discrete single filling position liquid filling machine. It will also be understood that the architecture of this invention could be fitted to and integrated to function with any other automated machine as may be desired. It will also be understood that the above embodiment can particularly be used in conjunction with an automatic liquid filling machine wherein each filling position, from one to many, is satisfied by the use of the present invention. In such an instance of use on an automatic liquid filler, of any architecture, it is to be understood that the individual operator interface previously described may be removed and its function replaced by a single operator interface serving the entire machine.

Within the scope of the claims of this application, encoder should be understood to include any encoder type, as well as any resolver, tachometer or other feedback device.

It is the desire of the inventors of the present invention that it be clearly understood that the embodiments of the invention, while preferred, can be readily changed and altered by one skilled in the art and that these embodiments are not to be limiting or constraining on the form or benefits of the invention.

What is claimed is:

1. A method of filling containers with a precise weight of liquid without the need to tare or weigh the container, comprising the following steps:

providing a source of liquid, a Coriolis liquid mass flow meter, a liquid filling nozzle, filling valve means associated with the nozzle, a electronic controller assembly interconnected with the meter and the filling valve means, and first and second fluid flow conduits extending between the source of liquid and the meter, and between the meter and the filling valve means, respectively;

establishing a volumetric flow rate through the meter at or above a necessary minimum flow rate and at or below a necessary maximum flow rate, whereby the meter can operate within a desired accuracy range;

quickly opening the filling valve means and causing flow through the nozzle to be at a relatively constant volumetric flow rate;

measuring the mass flow output from the meter while the filling valve means is open; and closing the filling valve means when the output from the meter equals a preset value representing a precise weight of liquid.

2. The method as set forth in claim 1 wherein pump means are provided, the pump means including a precision rotary pump in the first fluid flow conduit and drive means for driving the pump to establish a precise volumetric flow rate through the meter, the drive means capable of being started and stopped, wherein the filling valve means is opened before the drive means is started to establish a precise volumetric flow rate through the meter, and wherein the filling valve means is closed after the drive means is essentially stopped when the mass flow output from the meter equals a preset value representing a precise weight of liquid.

3. The method as set forth in claim 1 wherein pump means are provided, the pump means including a precision rotary pump in the first fluid flow conduit and drive means for driving the pump to establish a precise volumetric flow rate through the meter, and wherein a three way pipe joint is provided in the second fluid flow conduit, the first branch of the three way pipe joint extending to the filling valve means, and the second branch of the three way pipe joint capable of returning liquid to a location upstream of the rotary pump, and wherein the second branch is provided with a fast acting positive shut-off recirculating valve, wherein the filling valve means is opened when a net mass fill is to occur, wherein the open condition of the filling valve means is sensed by the electronic controller assembly which causes the recirculating valve to be quickly closed, wherein the recirculating valve is quickly opened when the mass flow output from the meter equals a preset value representing a precise weight of liquid, and wherein the filling valve means is quickly closed after the electronic controller assembly senses that the recirculating valve is open.

4. The method as set forth in claim 1 wherein the volumetric flow rate through the Coriolis liquid mass flow meter is established by maintaining a fixed pressure head on the source of liquid so that when the filling valve means is quickly opened a volumetric flow rate through the meter is established at or above a necessary minimum flow rate and at or below a necessary maximum flow rate and at a relatively constant volumetric flow rate, and wherein the filling valve means is quickly opened at the commencement of a fill, wherein the filling valve means is quickly closed when the output from the meter equals a preset value representing a precise weight of liquid.

5. The method as set forth in claim 1 wherein the volumetric flow rate through the Coriolis liquid mass flow meter is established by maintaining a fixed, precisely controlled, and relatively invariant pressure head on the source of liquid such that when the filling valve means is quickly opened a volumetric flow rate through the meter is established at a relatively constant volumetric flow rate at or above a necessary minimum flow rate and at or below a necessary maximum flow rate, wherein the filling valve means is quickly opened at the commencement of a fill, and wherein the filling valve means is quickly closed when the output from the meter equals a preset value representing a precise weight of liquid.

6. The method as set forth in claim 1 wherein the preset value requires that the duration of flow through the meter during a small dose measuring event must exceed a minimum fill time in order to overcome liquid mass flow meter flow start-up latency and thus achieve a useful dose repeatability.

7. An apparatus for filling containers with a precise weight of liquid without the need to tare or weigh the container, comprising the following:

a source of liquid;

a Coriolis liquid mass flow meter;

a liquid filling nozzle;

filling valve means associated with the nozzle to positively shut-off flow through the nozzle, the filling valve means capable of being quickly opened and shut;

first and second fluid flow conduits extending between the source of liquid and the meters and between the meter and the filling valve means, respectively;

means to establish a flow through the meter at a relatively constant volumetric flow rate which is at or above a necessary minimum flow rate and at or below a necessary maximum flow rate, whereby the meter can operate within a desired accuracy range;

an electronic controller assembly interconnected with the meter and the filling valve means, the electronic controller assembly being capable of quickly opening the filling valve means, and of quickly shutting the filling valve means when the output from the meter equals a preset value representing the precise weight of liquid.

8. The apparatus for filling containers with a precise weight of liquid as set forth in claim 7 in which the means to establish a volumetric flow rate through the meter attains its desired flow rate required by the liquid mass flow meter within 100 mS from the start of flow, thus assuring that the minimum mass flow rate of the meter is established or exceeded on or before the end of the liquid mass flow meter flow start-up latency period, thus favorably reducing the size of the mass dose the system is capable of providing within a desired accuracy of mass dose.

9. The apparatus for filling containers with a precise weight of liquid as set forth in claim 7 in which the Coriolis liquid mass flow meter has a pulse frequency which varies as mass flow varies through the meter, and wherein the electronic controller assembly is provided with means to count the mass meter flow pulse frequency when no mass flow is occurring through the meter, the count means allowing a determination of the frequency, said frequency being compared by electronic means within the electronic controller assembly with a predetermined frequency, said comparison allowing detection of loss of meter zero mass flow calibration, thus assuring maintenance of a desired level of mass dose accuracy by provision for an inhibit and alarm function when loss of meter mass zero flow calibration is so detected.

10. The apparatus for filling containers with a precise weight of liquid as set forth in claim 7 therein the Coriolis liquid mass flow meter outputs a mass flow pulse train, and further characterized by the provision of means to measure volumetric flow, which means established by another pulse train external to the meter, wherein the electronic controller assembly is provided with a counter, and wherein switching means are provided to allow the counter to count the volumetric pulse train instead of the mass flow pulse train thereby establishing means to establish and validate a repeatable volumetric dose capability, said volumetric repeatability allowing an improved level of mass flow dose accuracy and repeatability.

11. The apparatus for filling containers with a precise weight of liquid as set forth in claim 7 wherein the electronic controller assembly is provided with timing means to insure that the duration of flow through the liquid mass flow meter is of a minimum necessary time in order to achieve a mass dose of a desired accuracy.

12. The apparatus for filling containers with a precise weight of liquid as set forth in claim 7 wherein the electronic controller assembly is provided with timing means to measure the duration of liquid flow through the liquid mass flow meter necessary to dispense a mass dose selected by a machine operator, such measurement being for the purpose of determining if flow duration is too short to allow a desired level of mass flow accuracy due to start-up latency of the liquid mass flow meter.

13. The apparatus for filling containers with a precise weight of liquid as set forth in claim 12 wherein the electronic controller assembly includes an alarm, the alarm being activated if flow duration through the liquid mass flow meter is too short to permit a desired level of flow accuracy.

14. The apparatus for filling containers with a precise weight of liquid as set forth in claim 12 wherein flow duration is automatically increased until it is of sufficient length of time to allow a desired level of mass flow accuracy.

15. The apparatus for filling containers with a precise weight of liquid as set forth in claim 7 further comprising an incremental encoder coupled with the means to establish flow through the meter, and wherein the electronic controller assembly includes means to measure encoder frequency to prevent volumetric flow from being established at a rate through the Coriolis liquid mass flow meter too low to allow a desired level of mass flow accuracy, and to prevent volumetric flow from being established at a rate through the Coriolis liquid mass flow meter too high to allow desired level of mass flow accuracy.

16. The apparatus for filling containers with a precise weight of liquid as set forth in claim 7 further comprising an incremental encoder coupled with the means to establish flow through the meter, and wherein the electronic controller assembly is provided with means to initiate an alarm function in the event measured encoder frequency falls below or exceeds limits required to establish a necessary volumetric rate through the liquid mass flow meter to allow a desired level of mass meter accuracy.

17. The apparatus for filling containers with a precise weight of liquid as set forth in claims 7 further comprising an operator interface coupled with the electronic controller assembly whereby operating parameters such as mass fill dose and flow rate can be transmitted to the electronic controller assembly.

18. The apparatus for filling containers with a precise weight of liquid as set forth in claim 7, wherein the means to establish a precise and repeatable volumetric flow rate through the meter at or above a necessary minimum flow rate and at or below a necessary maximum flow rate is a pump means including a precision rotary pump in the first fluid flow conduit and drive means for driving the pump.

19. The apparatus for filling containers with a precise weight of liquid as set forth in claim 18 wherein the pump drive means establishes at least a minimum necessary volumetric flow rate through the Coriolis liquid mass flow meter within 100 mS from commencement of operation of the pump means.

20. The apparatus for filling containers with a precise weight of liquid as set forth in claim 18, wherein the drive means is servo motor.

21. The apparatus for filling containers with a precise weight of liquid as set forth in claim 20, further comprising an incremental encoder coupled with the pump means, the encoder providing a digital feedback loop to the servo motor, allowing the establishment of an extremely precise and stable control of the speed of the motor and pump, thus establishing a precise and repeatable volumetric flow through the mass flow meter.

22. The apparatus for filling containers with a precise weight of liquid as set forth in claim 21 wherein flow duration is automatically increased by the electronic controller assembly until it is of sufficient length of time to allow a desired level of mass flow accuracy.

23. The apparatus for filling containers with a precise weight of liquid as set forth in claim 21 wherein the electronic controller assembly is provided with means to initiate an alarm function in the event measured encoder frequency falls below or exceeds limits required to establish a necessary volumetric rate through the liquid mass flow meter to allow a desired level of mass meter accuracy.

24. The apparatus for filling containers with a precise weight of liquid as set forth in claim 18, wherein there is a three way pipe joint in the second fluid flow conduit, the first branch of the three way pipe joint extending to the filling nozzle, and the second branch of the three way pipe joint capable of returning liquid to a location upstream of the pump means, a fast acting positive shut-off recirculating valve being provided in the second branch.

25. The apparatus for filling containers with a precise weight of liquid as set forth in claim 24, wherein the fast acting positive shut-off recirculating valve is of the same construction as the filling valve means for the filling nozzle.

26. The apparatus for filling containers with a precise weight of liquid as set forth in claims 7 wherein the means to establish a volumetric flow rate through the liquid mass flow meter is means for establishing a fixed pressure head.

27. The apparatus for filling containers with a precise weight of liquid as set forth in claim 26, wherein the means for establishing a fixed pressure head is a constant level reservoir.

28. The apparatus for filling containers with a precise weight of liquid as set forth in claim 26, wherein the means for establishing a fixed pressure head is a constant pressure reservoir.

29. The apparatus for filling containers with a precise weight of liquid as set forth in claim 7 wherein the relatively constant volumetric flow rate-through the mass flow meter, once established, is so accurate that any change in mass flow rate through the mass flow meter is due to a change principally in the density of the liquid flowing through the mass flow meter.

* * * * *